(12) United States Patent
Bradley et al.

(10) Patent No.: US 12,141,217 B2
(45) Date of Patent: Nov. 12, 2024

(54) VIRTUAL REALITY BOOKMARKS

(71) Applicant: AT&T Intellectual Property I, L.P., Atlanta, GA (US)

(72) Inventors: Nigel Bradley, Canton, GA (US); Eric Zavesky, Austin, TX (US); James Pratt, Round Rock, TX (US); Ari Craine, Marietta, GA (US); Robert Koch, Peachtree Corners, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 163 days.

(21) Appl. No.: 17/821,875

(22) Filed: Aug. 24, 2022

(65) Prior Publication Data

US 2024/0070216 A1 Feb. 29, 2024

(51) Int. Cl.
*G06F 16/955* (2019.01)
*G06T 19/00* (2011.01)

(52) U.S. Cl.
CPC .......... *G06F 16/9562* (2019.01); *G06T 19/00* (2013.01); *G06T 2200/24* (2013.01); *G06T 2219/024* (2013.01)

(58) Field of Classification Search
None
See application file for complete search history.

(56) References Cited

U.S. PATENT DOCUMENTS

| | | | | |
|---|---|---|---|---|
| 9,392,212 | B1* | 7/2016 | Ross | G06T 19/006 |
| 2005/0210145 | A1* | 9/2005 | Kim | G06F 16/743 |
| | | | | 709/219 |
| 2015/0143395 | A1* | 5/2015 | Reisman | H04N 21/47202 |
| | | | | 725/14 |
| 2018/0095636 | A1* | 4/2018 | Valdivia | G06F 3/011 |
| 2022/0165037 | A1* | 5/2022 | Zavesky | H04L 67/131 |

\* cited by examiner

*Primary Examiner* — Edward Martello
(74) *Attorney, Agent, or Firm* — Guntin & Gust, PLC; Dana B. LeMoine

(57) ABSTRACT

The disclosed technology is directed towards virtual reality bookmarks that maintain state data for a user in a virtual reality environment, such that the user can to return to that virtual reality environment at a later time. While presenting virtual reality session content to a user, a system or the like can receive a request to pause the virtual reality session from a user. Session state data, e.g., in the form of a virtual reality bookmark, is saved based on the pause request. A later request to resume presentation of the virtual reality content results in the system accessing the virtual reality session data, which is used to present resumed virtual reality session content to the user based on the session state data. A pause request may be for an individual user or for each user participating in a session. Virtual reality bookmarks may be shared with other users.

20 Claims, 17 Drawing Sheets

122(3)

| Session ID | Title | VR App | Virtual Location | Virtual Time | Session Status | Users |
|---|---|---|---|---|---|---|
| xyz123 | Budget Mtg | Real Meetup | 20.3, 34.6, 87.3 | 23421.3 | ACTIVE | UserA PRESENT<br>UserB ABSENT<br>UserC PRESENT |

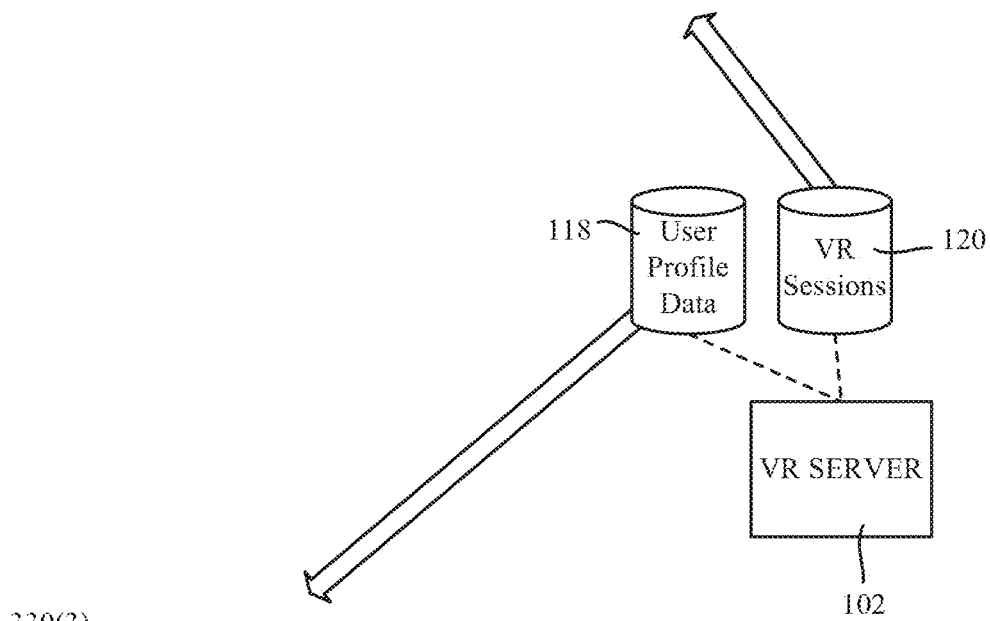

330(3)

| User ID | Session ID | VR App | Session Status | User Location | Pause Time | Other State |
|---|---|---|---|---|---|---|
| A | Budget Mtg | Real Meetup | ACTIVE PRESENT | x1, y1, z1 | 23421.3 | ⋮ |
| B | Budget Mtg | Real Meetup | ACTIVE ABSENT | x2, y2, z2 | 23421.3 | ⋮ |
| C | Budget Mtg | Real Meetup | ACTIVE PRESENT | x3, y3, z3 | 23421.3 | ⋮ |
| | Golf w/ Sue | VR Golf App | PAUSED | x4, y4, z4 | 12341.9 | ⋮ |

FIG. 7

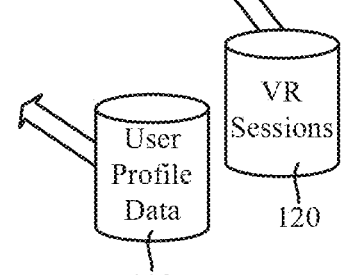
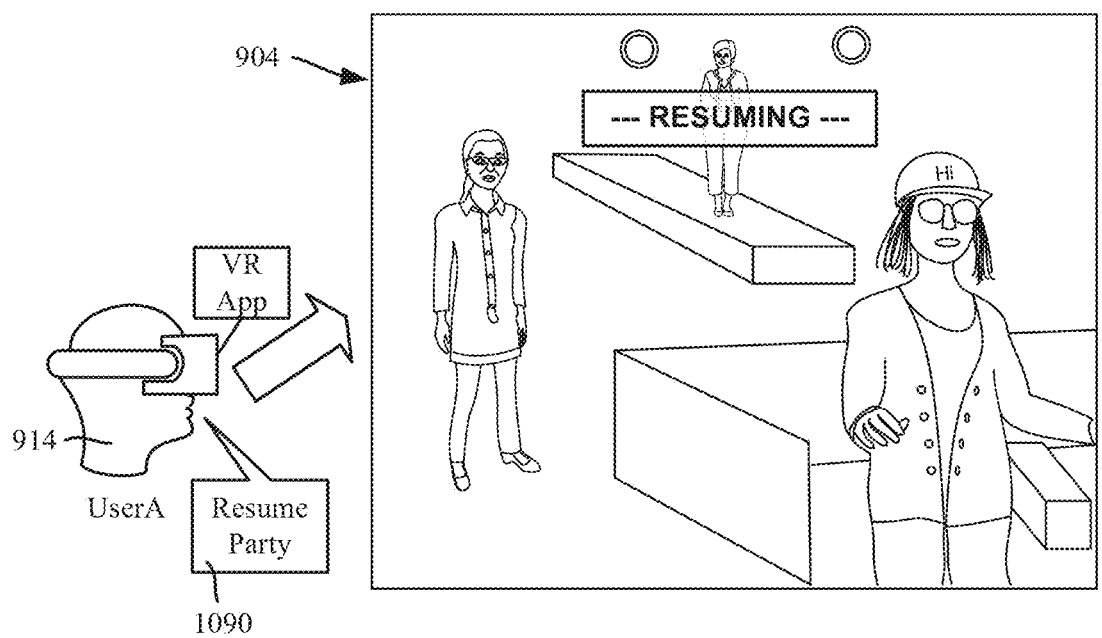
FIG. 10

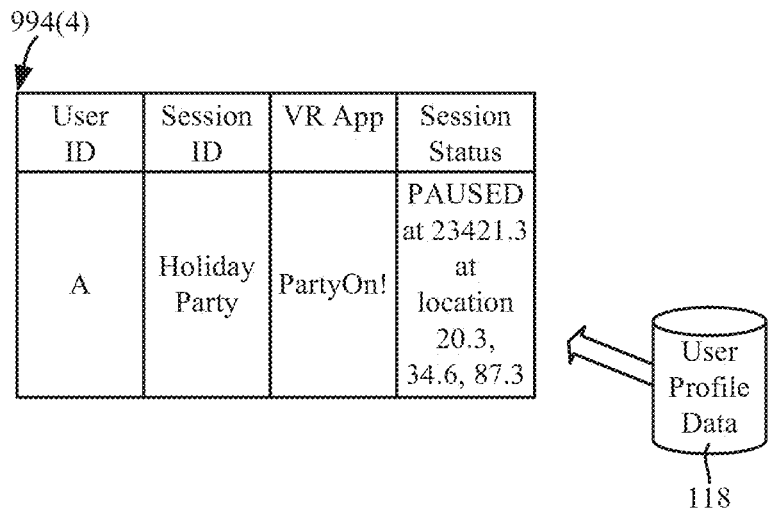
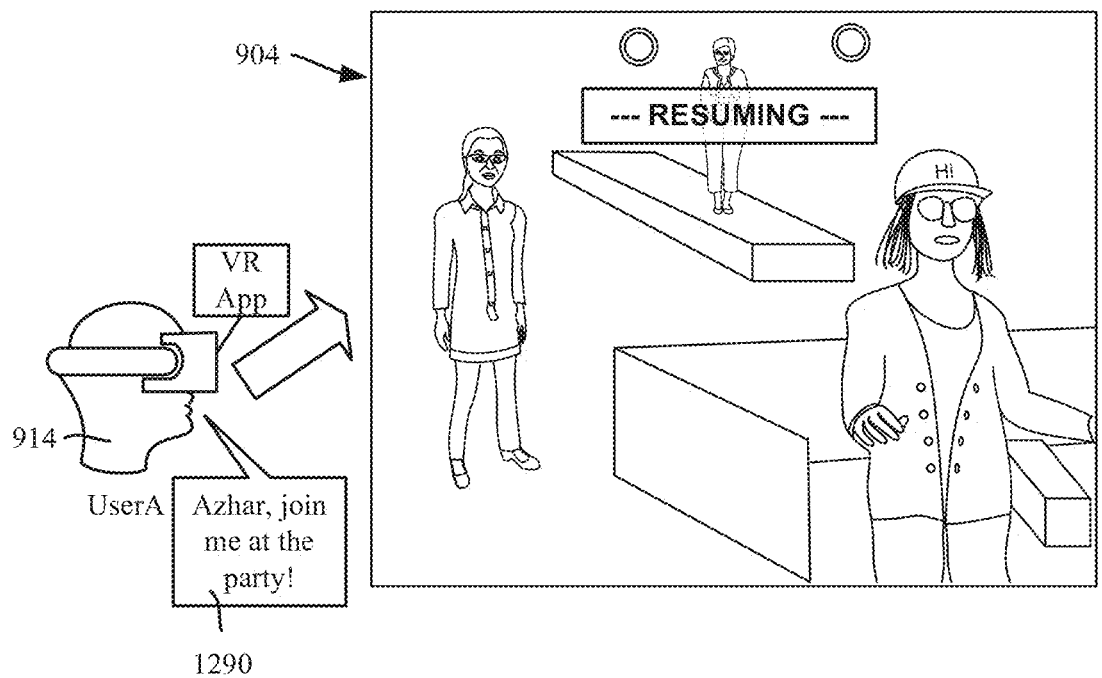
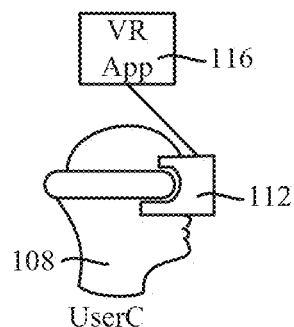
FIG. 12

VIRTUAL REALITY BOOKMARKS

TECHNICAL FIELD

The subject application relates to the maintaining and use of information in general, and more particularly to maintaining and using information related to virtual reality applications, and related embodiments.

BACKGROUND

Contemporary users of virtual reality applications change among different virtual environments from time to time, e.g., from a meeting application to a game application. Even if a user has only one virtual environment available, the user sometimes has to leave that virtual environment. Such scenarios cause issues when attempting to go back into the virtual environment.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 7 is an example representation of example data structures relating to a resumed virtual reality session, in accordance with various aspects and embodiments of the subject disclosure.

FIG. 10 is an example representation of resuming a virtual reality session that was paused with respect to an individual user, in accordance with various aspects and embodiments of the subject disclosure.

FIG. 12 is an example representation of sharing a bookmark of a virtual reality session, in accordance with various aspects and embodiments of the subject disclosure.

DETAILED DESCRIPTION

Figure 1:
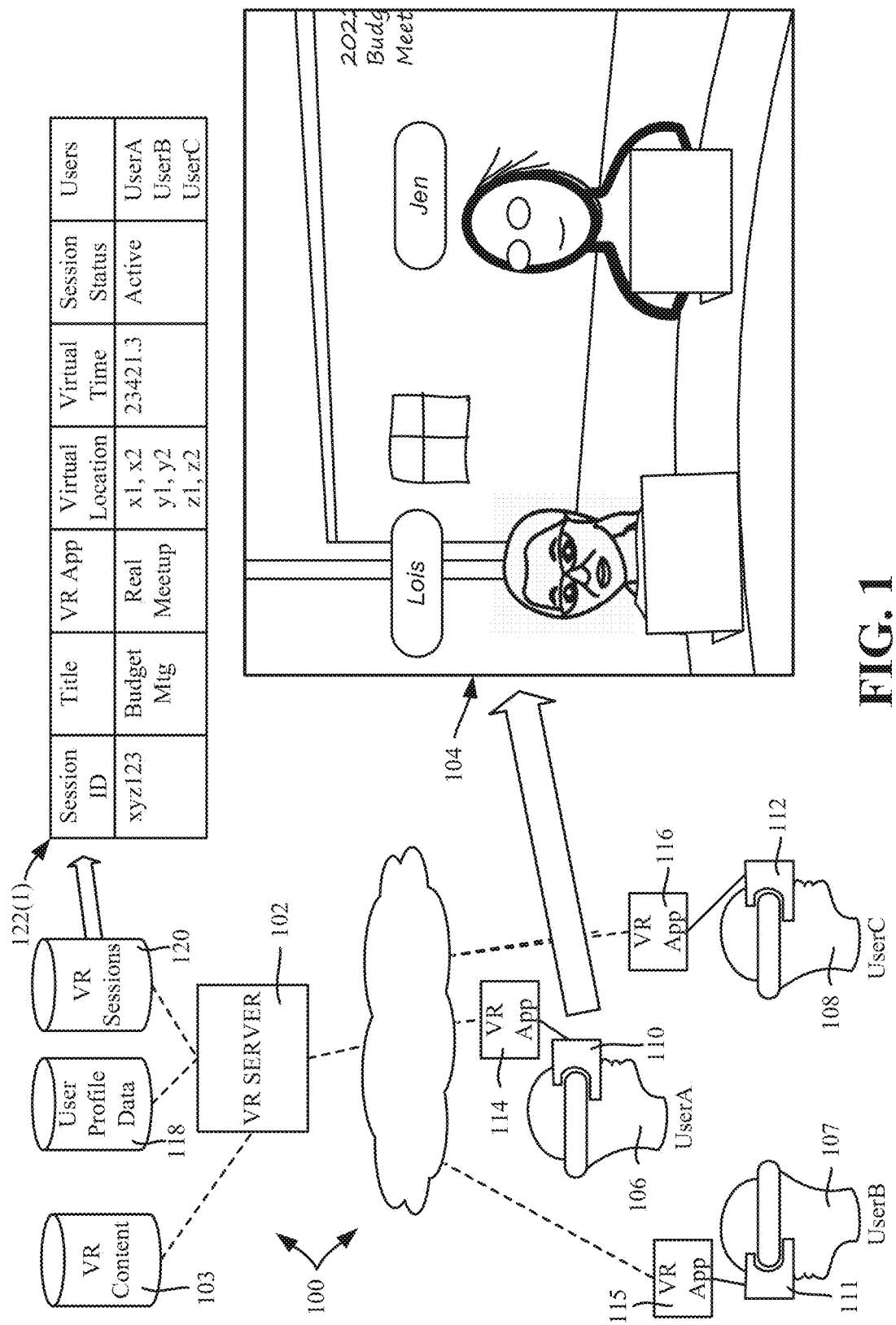
FIG. 1 is a block diagram of an example system/architecture for maintaining virtual reality session information, in accordance with various aspects and embodiments of the subject disclosure.

The technology described herein is generally directed towards virtual reality bookmarks that maintain data to allow a user to "save a place" in a virtual reality environment, in order to return to that place at a later time. In doing so, the activity of other users within the virtual reality environment may continue, or also may be paused until the return. The technology described herein also facilitates the use of other features, such as to share virtual reality bookmarks with other users, such that they may be invited to meet up together at a point in virtual time and location at a later actual time.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example system/architecture 100 including a virtual reality (VR) server 102, which is coupled to a virtual reality content data store 103 to present a virtual environment 104 to participating users. Such virtual reality content may create any of a number of different types of experiences for the users. For example, virtual reality content may create a meeting, a party, a concert, or many other types of environments where people may gather together virtually. To this end, the virtual reality server 102 server has access to virtual reality content in the data store 103, which may be presented to create the virtual reality environment that users can experience together. Note that the examples described herein are generally directed towards multiple participating parties, however as will be understood, the technology also applies to one user experiencing a virtual environment.

Any number of users can participate in a virtual reality session; three such users 106-108 (UserA, UserB, and UserC) are depicted in the example of FIG. 1. The users 106-108 are with equipped with virtual reality devices 110-112 (e.g., a virtual reality viewer and audio capabilities, such as ear phones), respectively, with respective application programs (VR Apps) 114-116 coupled to or incorporated into the respective virtual reality devices 110-112). Note that the example virtual reality session 104 that is represented in FIG. 1 is being experienced from the perspective of the UserA 106.

Each user may have user profile data that is stored in a user profile data store 118, e.g., a database. Also, a virtual reality sessions data store 120, e.g., a database may exist to maintain status and data related to virtual reality sessions (e.g., in an example record 122(1)) that are currently in progress and/or have been in progress in the past and have been paused, to be restarted at a later time if desired, as described herein.

As depicted, the exemplary environment 104 is thus presented using a virtual reality meeting among the three users 106-108. Each user may log into the virtual reality server 102 to the same session to participate in the virtual reality meeting. A session ID (e.g., "xyz123") may be recorded in the virtual reality sessions data store 120, e.g., a database record such as with the additional data as shown that is descriptive of the session in progress. A virtual reality application that is used may be recorded and a virtual location within the environment created by that virtual reality application may be recorded, for instance, as three dimensional coordinates within the environment created by that application. While simple sets of three-dimensional virtual coordinates (x1, x2, y1, y2 and z1, z2) are shown in FIG. 1, it is understood that there can be a more complex range of coordinates describing an irregular space, or some other way to locate a space, such as virtual coordinates with a radius, virtual coordinates with a length, width and depth, and/or the like. A virtual time also may be recorded that is representative of a time, which may or may not be the same as actual time, but represents a measure of time within the virtual reality environment. The virtual time and virtual location values may change over time and be updated accordingly. The session status is shown as "Active" and the active users (UserA, UserB, and UserC) are also recorded.

Figure 2:
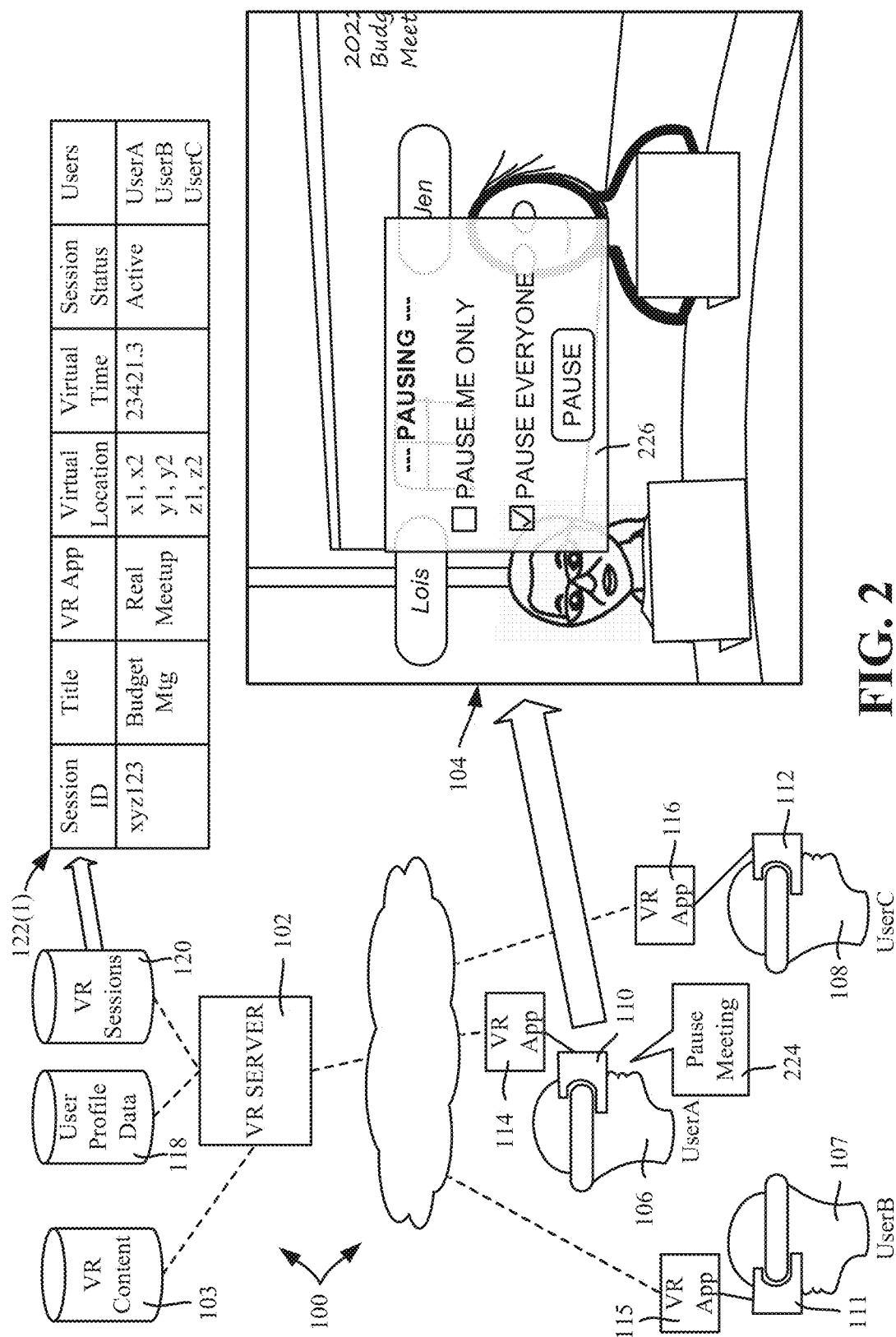
FIG. 2 is a block diagram of an example system/architecture, including an interface for pausing a virtual reality session, in accordance with various aspects and embodiments of the subject disclosure.

Consider that in the example of FIG. 2 the UserA 106 requests to pause the session via virtual reality input, such as by speaking (block 224), gesturing or otherwise interacting with the virtual reality application 114. As shown via the example interactive interface 226, the pause request may be further specified as a request to either pause the session for all users or to pause the session only for the user requesting the pause. Note that there may be some virtual reality server control of such a "pause everyone" command, such that, for example, a user needs to be authorized in some way to pause a meeting involving others to avoid some rogue user from accidentally or intentionally pausing everyone else's meeting.

Figure 3:
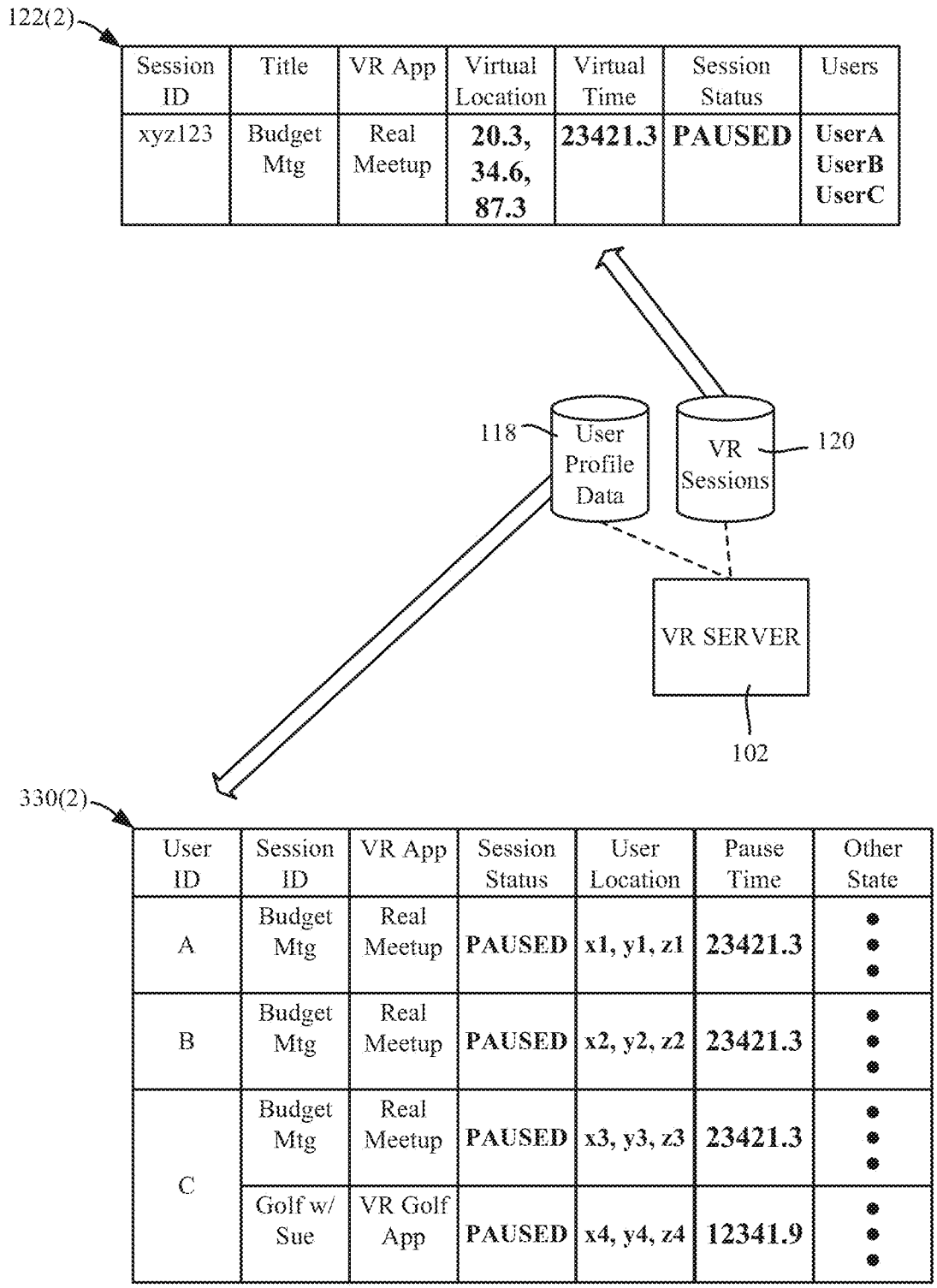
FIG. 3 is an example representation of example data structures relating to a paused virtual reality session, in accordance with various aspects and embodiments of the subject disclosure.

As shown via the updated data structure (modified from data structure state 122(1) to data structure state 122(2) in FIG. 3), in the case of a pause request where the user request is to pause everyone, the virtual reality server 102 saves the virtual location, the virtual time, and the active users at the time of the pause request to the relevant record in the virtual reality sessions data store 120. For the example shown, when UserA 106 requests the session pause (FIG. 2), the data is recorded at the time of the pause in the VR sessions data store 120 as shown in the data structure state 122(2) (FIG. 3).

As also shown in FIG. 3 via the data structure 330(2), each user present in the meeting has their user profile data updated (e.g., from "active," not explicitly shown to "paused") to indicate that the session is paused for them. An individual user may have more than one session paused at any given time, even while they are active in yet another session. In the example shown in FIG. 3, the UserC now has the budget meeting session paused and also has a virtual reality session for a round of virtual golf paused as well. The virtual time of the pause as well as the virtual location data of where a user's avatar was located when paused also may be maintained, as generally described herein. Other per-user state data also may be maintained, such as the direction each user was looking at the time of the pause, what content a user had showing on her display screen at the time, and so on.

Figure 4:
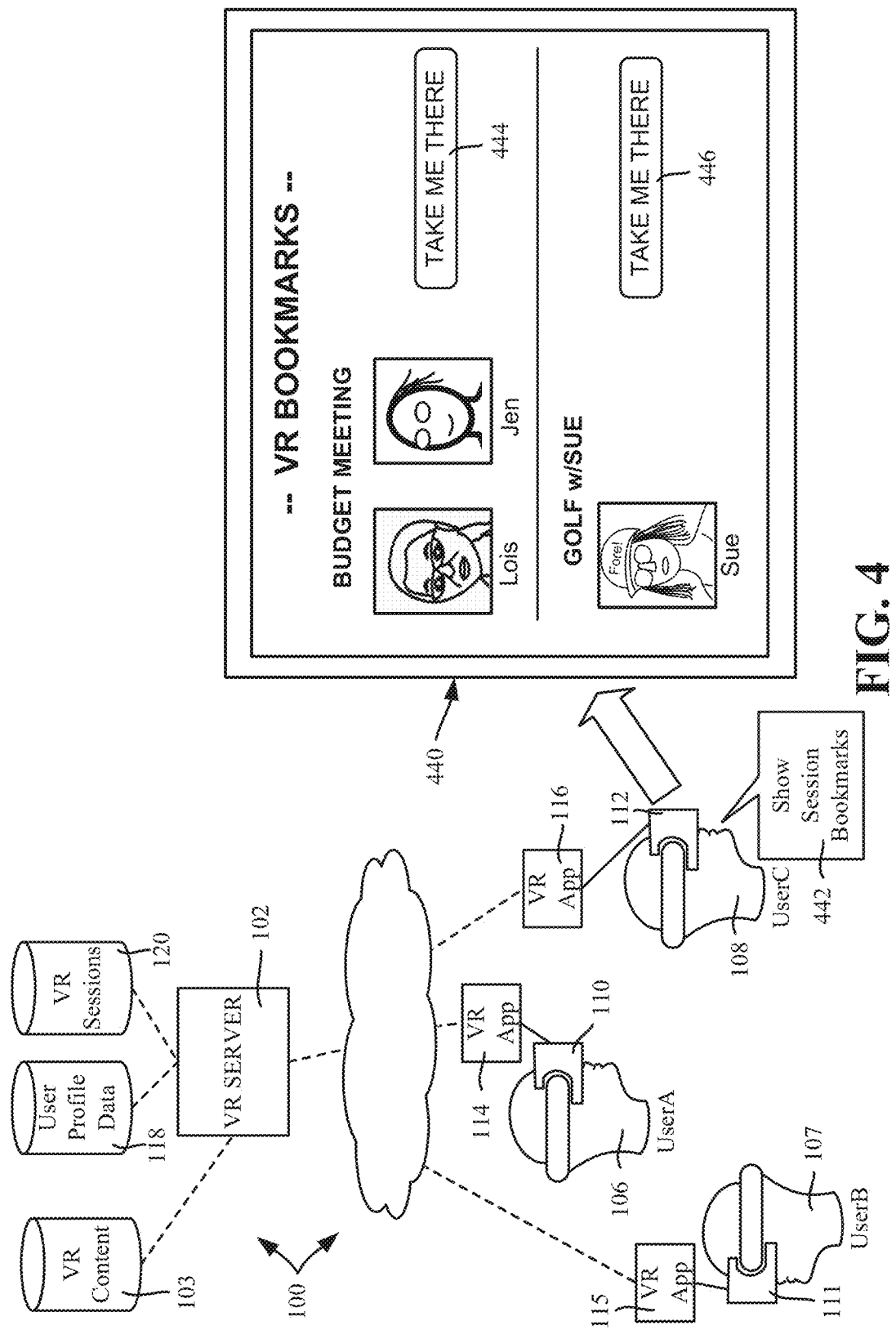
FIGS. 4 and 5 are example representations related to interfacing with virtual reality bookmarks, in accordance with various aspects and embodiments of the subject disclosure.

As shown in the example interface 440 of FIG. 4, paused virtual reality sessions may be represented as virtual reality bookmarks. A user may request (e.g., as represented via block 442) that the virtual reality server present to them his or her paused sessions, that is, their virtual reality bookmarks. The virtual reality server 102 accesses the user profile data store 118 to retrieve and present to the requesting user (UserC 108) the user's virtual reality bookmarks. In presenting the virtual reality bookmarks to the user, the virtual reality server 102 also may present an opportunity for user to reenter the session, e.g., as represented in FIG. 4 by the two "TAKE ME THERE" interactive elements 444 and 446.

Figure 5:
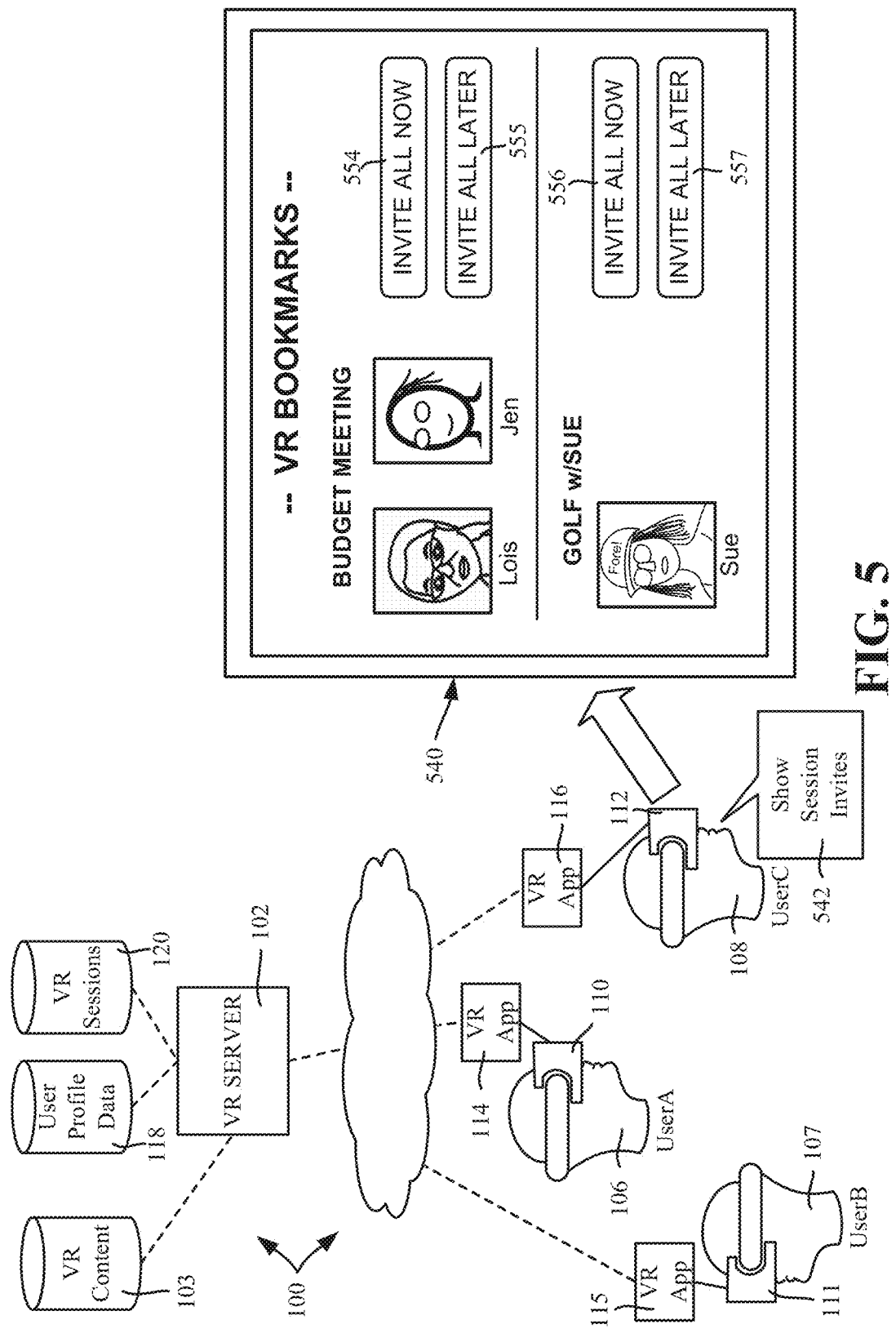

An invitation to restart a virtual reality session may be sent to other users. As shown via the example interface 540 of FIG. 5, the user may use their bookmarks (e.g., block 542) to initiate a request to all other users to rejoin the session. The invitation may be to rejoin immediately (e.g., via interactive elements 554 and 556) or may be to schedule rejoining of the session at a later time (e.g., via interactive elements 555 and 557); note that a calendar invite or the like may be presented upon selection of one of the interactive elements 555 and 557. In any event, the invitation may be sent to the other users for acceptance.

In some virtual reality applications and/or sessions, it is irrelevant whether virtual time has passed or not, such as for the case when the session has been paused for all users. In such a temporal stateless re-entry scenario, when users opt to rejoin a paused session, the saved session data is used to re-instantiate the session as described herein. Because the paused users can resume participation in the virtual reality session at a later time, it is thus irrelevant whether time has passed in the virtual environment or not.

Figure 6:
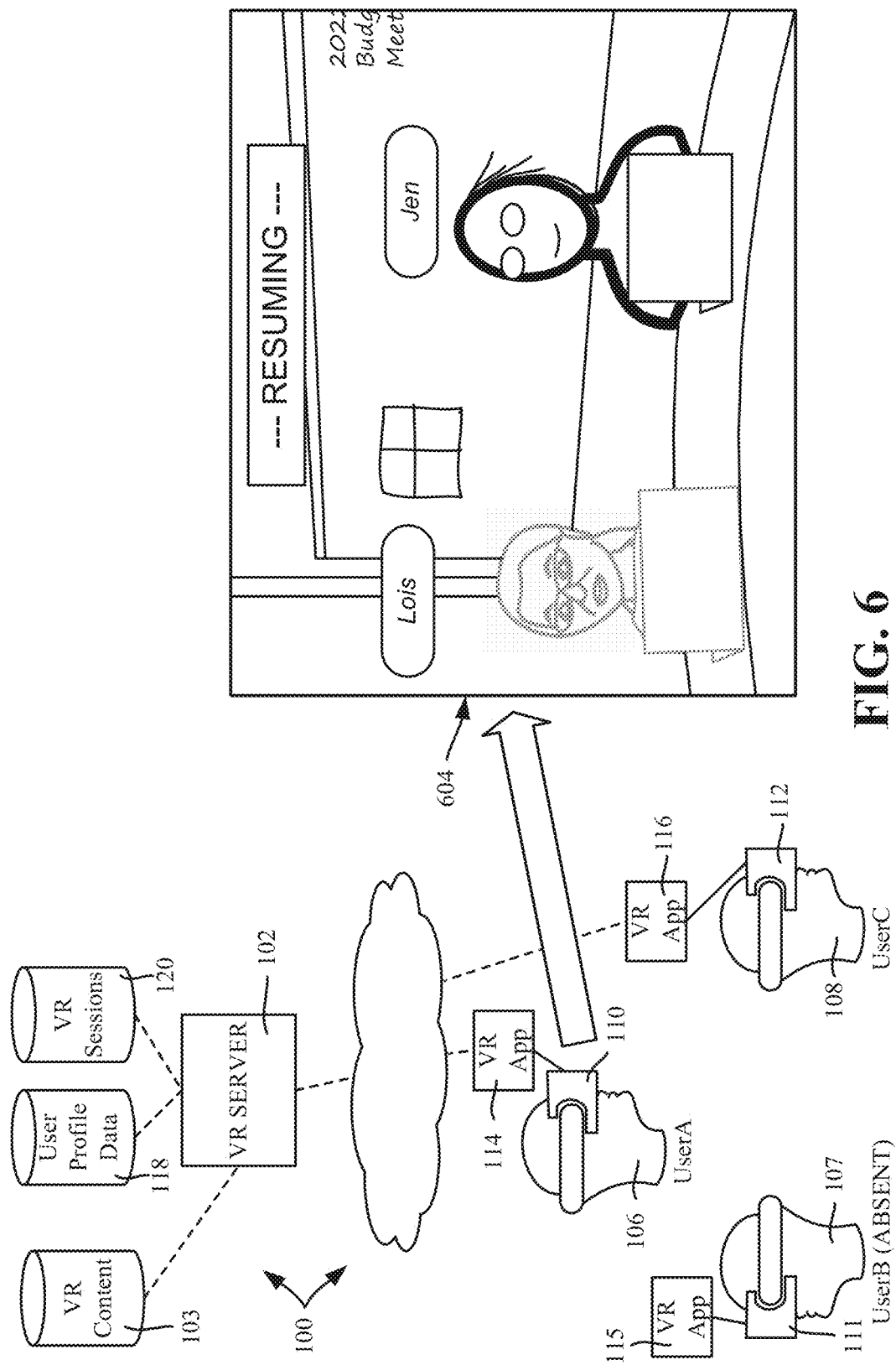
FIG. 6 is an example representation of an altered avatar representing a user who has not rejoined a resumed (unpaused) virtual reality session, in accordance with various aspects and embodiments of the subject disclosure.

When a user rejoins, their virtual reality avatar may be redisplayed. If a user has not yet rejoined, that user's avatar may be presented in an altered form until they rejoin from its last representation within the environment is illustrated via the resumed virtual environment 604 in FIG. 6 (from the perspective of UserA 106) and via the updated data structures 122(3) and 330(3) in FIG. 7. Note that UserB 107, corresponding to "Lois" in the resumed virtual environment 604, is absent from the resumed meeting, and in the resumed virtual environment 604 is shown as having an altered avatar appearance (semitransparent in this example, although other altered avatar representations are feasible) to indicate her absent status to other participants. In another embodiment, the data structures 330(3) may also include multiple references to the same session. In this example, the virtual reality application "Real Meetup" and session "Budget Mtg" may have one pause point where a user executed a sales pitch that invests in flying cars and one where the user liquidated all assets within states starting with 'T'. Although not explicitly illustrated in FIG. 7, such pauses may be simultaneously stored with "branching" information that describes the variant conditions within the single original session. Further, the system may allow one user (e.g., UserC) or more users (e.g., UserA and UserC who are both present) to resume one or more of the stored pause points alone or with others, with no loss of generality.

Figure 8:
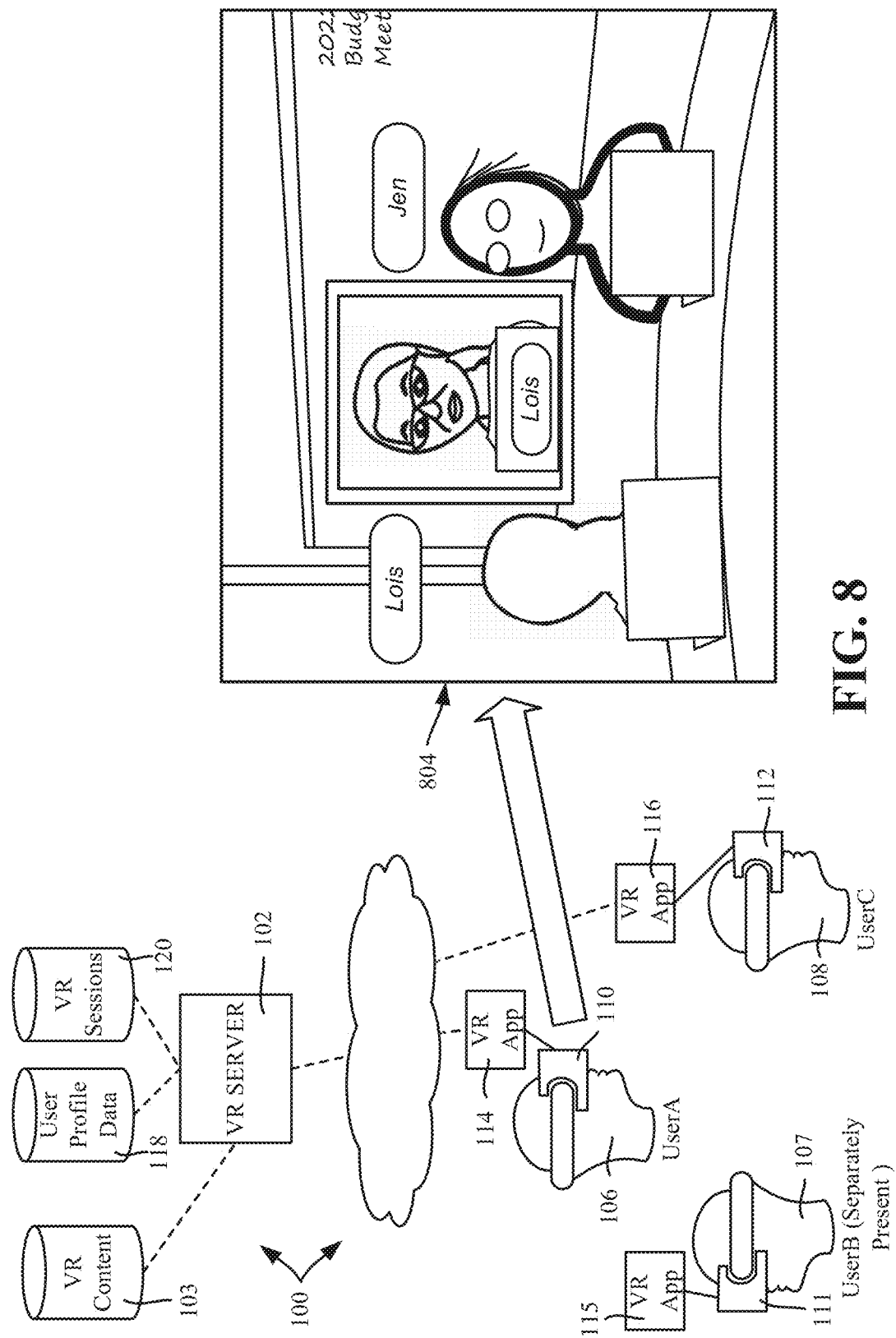
FIG. 8 is an example representation of an altered avatar and presentation of a user who has rejoined a resumed virtual reality session via a non-virtual reality mode, in accordance with various aspects and embodiments of the subject disclosure.

When a user rejoins at a later time, it may be the case that he or she is unable to rejoin in a virtual manner. Therefore, an alternative participation in the virtual reality environment may be presented, as generally represented via the displayed video (or image) in FIG. 8. For instance, the user may rejoin in a video mode (block 880), or audio only mode, or via other representation. Such alternate participation can be facilitated by sending users an alternative address, such as a link, to use to rejoin the session when the invitation to rejoin is sent out. In this example, in the presentation of the virtual environment 804, the representation of the avatar for "Lois" in the resumed virtual environment 604, is altered to appear opaque (in this example, although other altered avatar representations are feasible) to indicate she is not present via virtual reality, but is present in some other way.

In other VR applications, it is relevant whether virtual time has passed or not. As an example, this may be the case when the session has been paused for one user while other users continue to participate in the session.

In this case, when the user wishes to rejoin the session, they may wish to rejoin the session at the same virtual time that it was paused, even though actual time may pass between the time they pause the session and the time the user rejoins the session. Therefore, while the session itself may remain active for other users, the user's pause may be represented in their profile with the record of their session participation being paused at a specific virtual time.

Figure 9:
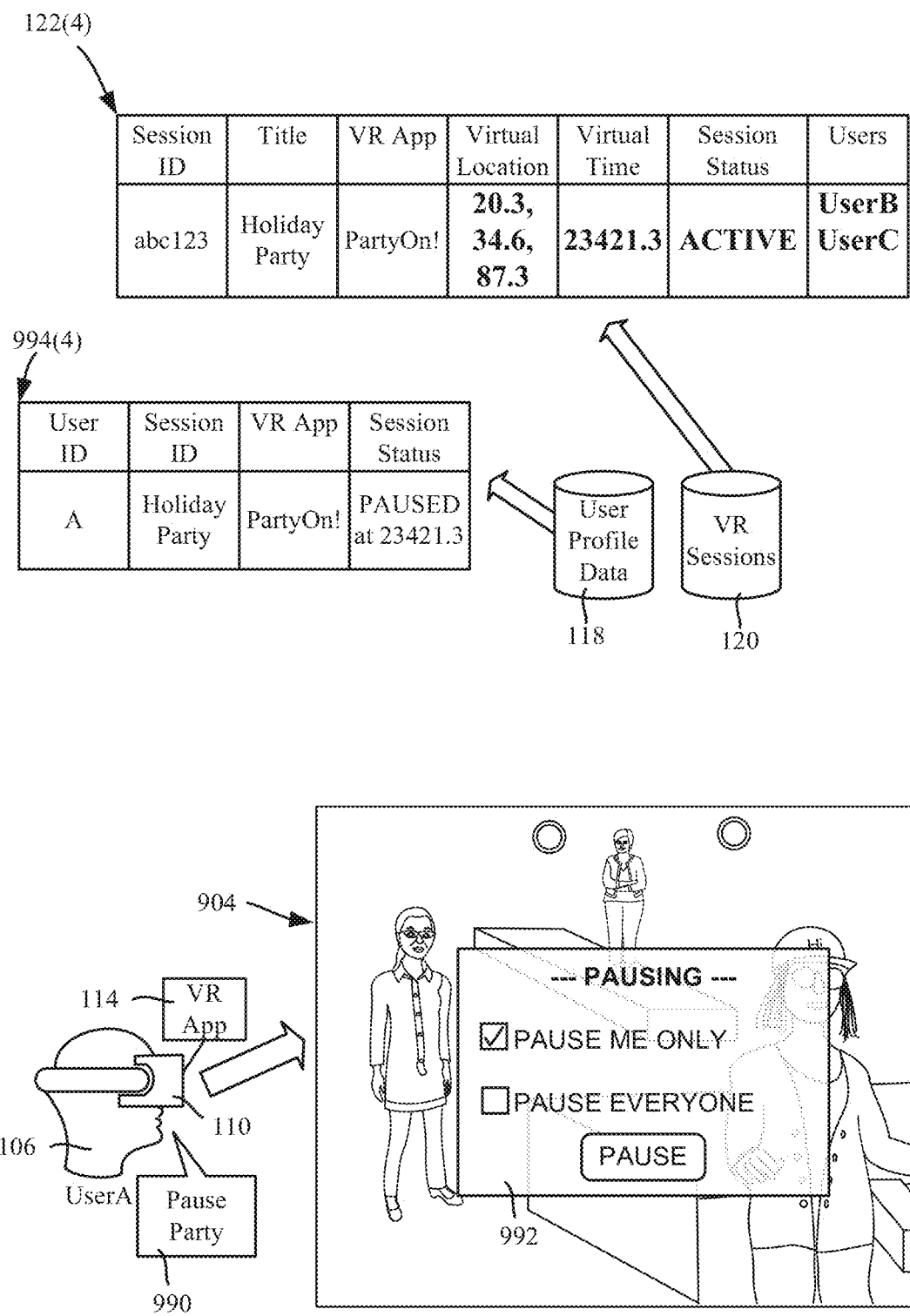
FIG. 9 is an example representation of a user's view, including an interface for pausing a virtual reality session with respect to an individual user, in which the virtual reality session has continued without the paused user, in accordance with various aspects and embodiments of the subject disclosure.

FIG. 9 represents such temporal stateful re-entry, in which the UserA 106 interacts (block 990) to pause the virtual session as being viewed via block 904. An interactive interface 992 is presented in this example, by which the UserA 106 can elect to "pause me only" or "pause everyone" (pausing everyone may not be allowed as set forth herein). In this example, the user pauses but, as indicated in the updated data structure 122(4) for the session data, and in the user profile data structure 994(4) for the UserA, the UserA is now paused. In this example, the identity of the paused user, UserA has been removed the session data record, although it is feasible to have UserA's data remain in the record but with a "paused" flag or the like indicating that UserA is paused while the session remains active.

In this case, when the user reenters the session (block 1090, FIG. 10), the virtual reality server 102 may use the time of the pause for that user from the user's profile and reinsert the user at that virtual point in time (and virtual location, if appropriate) of the session. Therefore, while the virtual time of the active session may be later than the paused virtual time, the virtual time of UserA's participation in the session may begin at the earlier paused virtual time. This is depicted in the example of FIG. 10, where the updated data structure 122(5) for the session data has a different virtual time relative to the active resuming time in the user profile data structure 994(5) for the UserA, in which the UserA is now active.

It should be noted that a user who has resumed a paused virtual reality session from the pausing time can further interact, such as to fast-forward to the party (in this example) up to real time, while viewing anything missed at the faster "playback" rate. A user can also rewind, provided that sufficient virtual reality session data is maintained to go backwards in virtual time.

Figure 11:
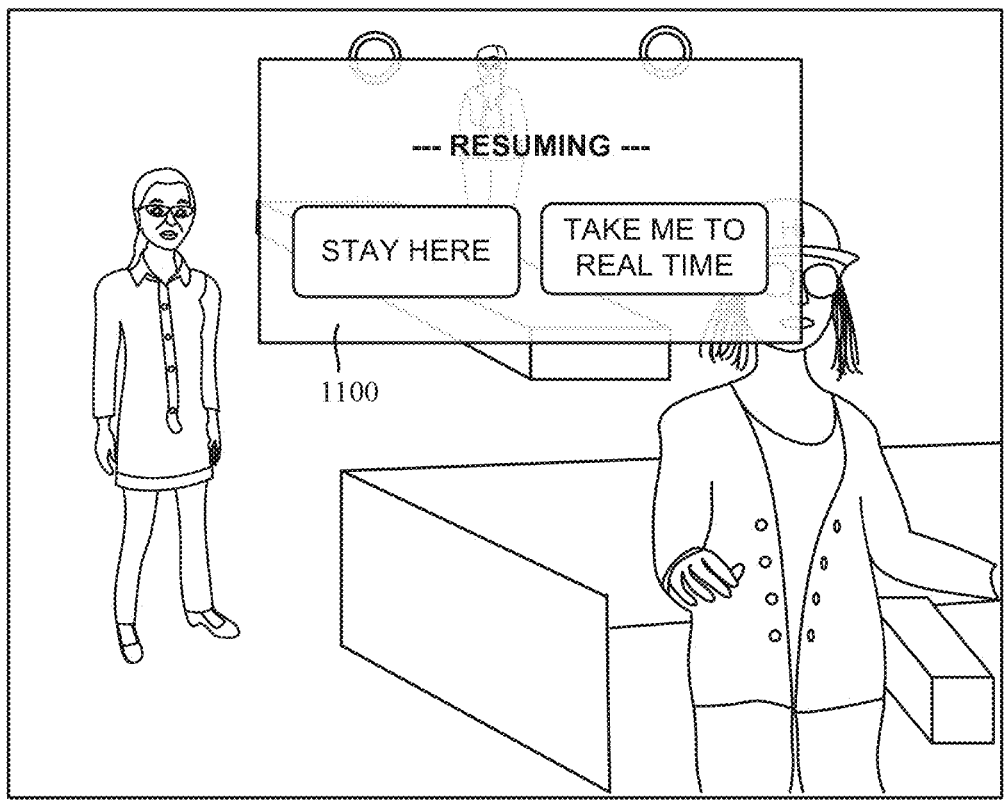
FIG. 11 is an example representation of resuming a virtual reality session that was paused with respect to an individual user, with an interface that allows the user to resume the virtual reality session from when paused or rejoin in real time, in accordance with various aspects and embodiments of the subject disclosure.

Alternatively, as represented in the example interactive interface 1100 of FIG. 11, the user may select an option to take them to real time, in which case they reenter the session at the actual time-point of the session rather than the paused virtual-time point of the session. A user also may interact to experience anything missed between the time of pausing and the real time rejoining. It is possible that the virtual session has ended by the time the user attempts to rejoin, and if so, a virtual session replay may be made available, possibly in a different format, such as a video rather than virtual reality, if the virtual reality content is preserved. Although not explicitly depicted, the records 122(5) may also contain an additional indicator about the ability for the options of each user to catch-up upon rejoining. For example, in some scenarios in which the elapsed virtual session time is critical to the narrative (e.g. a story, a factual recounting, etc.) such that the resuming users need to playback at normal or accelerated speed, and are ordinarily unable to immediately resume at "real time." In another example, a playback mode to catch-up may be restricted or unavailable and users may only have the option to immediately join at "real time" and thereby miss the previous virtual moments, or possibly be allowed to see content snapshots (e.g. images, text, spoken utterances) from the missed moments.

After a session pause, a user may share his or her virtual reality bookmark with another user. For example, as generally represented in FIG. 12 (block 1290), UserA 106 may invite UserC 108 ("Azhar") to join her sometime after the pause. The invitation to rejoin may be immediate (e.g., join me now), or scheduled for a later time (e.g., join me at 8:00 pm real time, when I will be rejoining). In this case, UserA's user profile data may be used to save the virtual time as well as the virtual location of UserA at the time of the pause. By sharing this bookmark with UserC, if UserC accepts and joins the session via the shared bookmark, UserC is inserted at the proper virtual location and virtual time within the session so as to join UserA.

Figure 13:
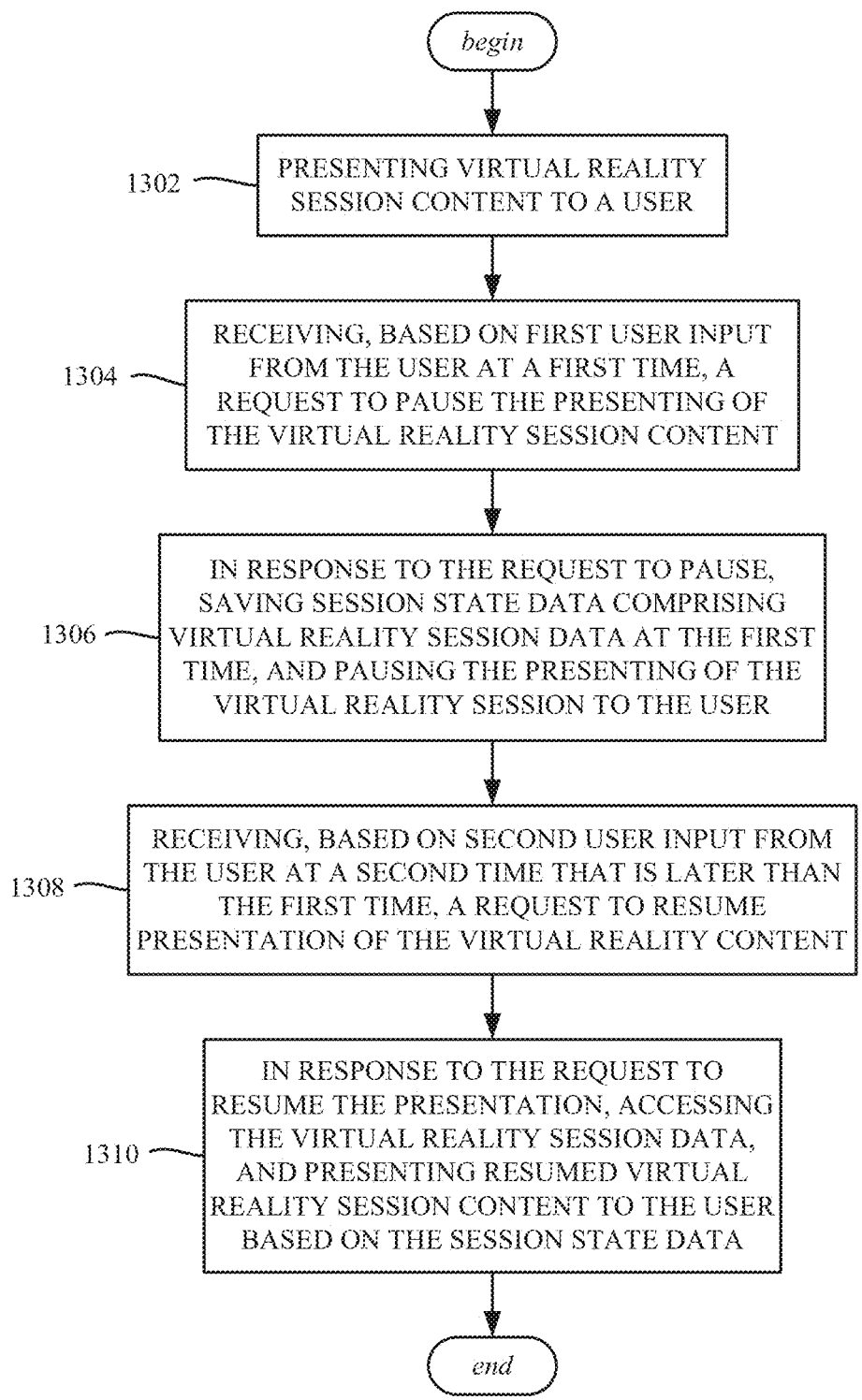
FIG. 13 is a flow diagram representing example operations related to pausing a virtual reality session, and presenting resumed virtual reality session content to a user based on saved session state data, in accordance with various aspects and embodiments of the subject disclosure.

One or more example aspects are represented in FIG. 13, and can correspond to a system, including a processor, and a memory that stores executable instructions that, when executed by the processor, facilitate performance of operations. Example operation 1302 represents presenting virtual reality session content to a user. Example operation 1304 represents receiving, based on first user input from the user at a first time, a request to pause the presenting of the virtual reality session content. Example operation 1306 represents, in response to the request to pause, saving session state data comprising virtual reality session data at the first time, and pausing the presenting of the virtual reality session to the user. Example operation 1308 represents receiving, based on second user input from the user at a second time that is later than the first time, a request to resume presentation of the virtual reality content. Example operation 1310 represents, in response to the request to resume the presentation, accessing the virtual reality session data, and presenting resumed virtual reality session content to the user based on the session state data.

Further operations can include presenting the virtual reality session to the user, after the pausing, as a representation of a virtual reality bookmark.

The user can be represented as an avatar in the virtual reality session, and the session state data can include at least one of: location data representing a location of the avatar in the virtual reality session at the first time, appearance data representing an appearance of the avatar at the first time, or field of view data representing a viewing perspective of the user in the virtual reality session at the first time.

Presenting of the resumed virtual reality session content to the user can include rejoining the user at a current time within the virtual reality session.

The user can be a first user, and further operations can include presenting the virtual reality session to a second user between the first time and the second time.

The user can be a first user, and further operations can include pausing the presenting of the virtual reality session to a second user based on the request to pause.

The user can be a first user, the presentation can be a first presentation, and further operations can include sending an invitation to a second user to receive a second presentation of the virtual reality session at the second time.

The user can be a first user, and further operations can include sending an invitation to a second user to receive a second presentation of the virtual reality session at a scheduled future time.

The user can be a first user, and further operations can include continuing to present the virtual reality session to a second user after the pausing of the presentation of the virtual reality session to the first user. Further operations can include presenting an avatar of the first user in an altered form as presented to the second user after the pausing of the presentation by the first user. Further operations can include presenting an avatar of the first user in a form, as viewed by the second user, that is different from the altered form, after the resuming of the presentation of the virtual reality session by the first user.

Further operations can include detecting, after the resuming the presentation of the virtual reality session to the user, interaction by the user with the virtual reality session, and modifying the presentation of the virtual reality session based on the interaction. Modifying the presentation of the virtual reality session based on the interaction can include fast forwarding the presentation of the virtual reality session from a virtual time within the virtual reality session towards an actual time of the presentation of the virtual reality session.

Figure 14:
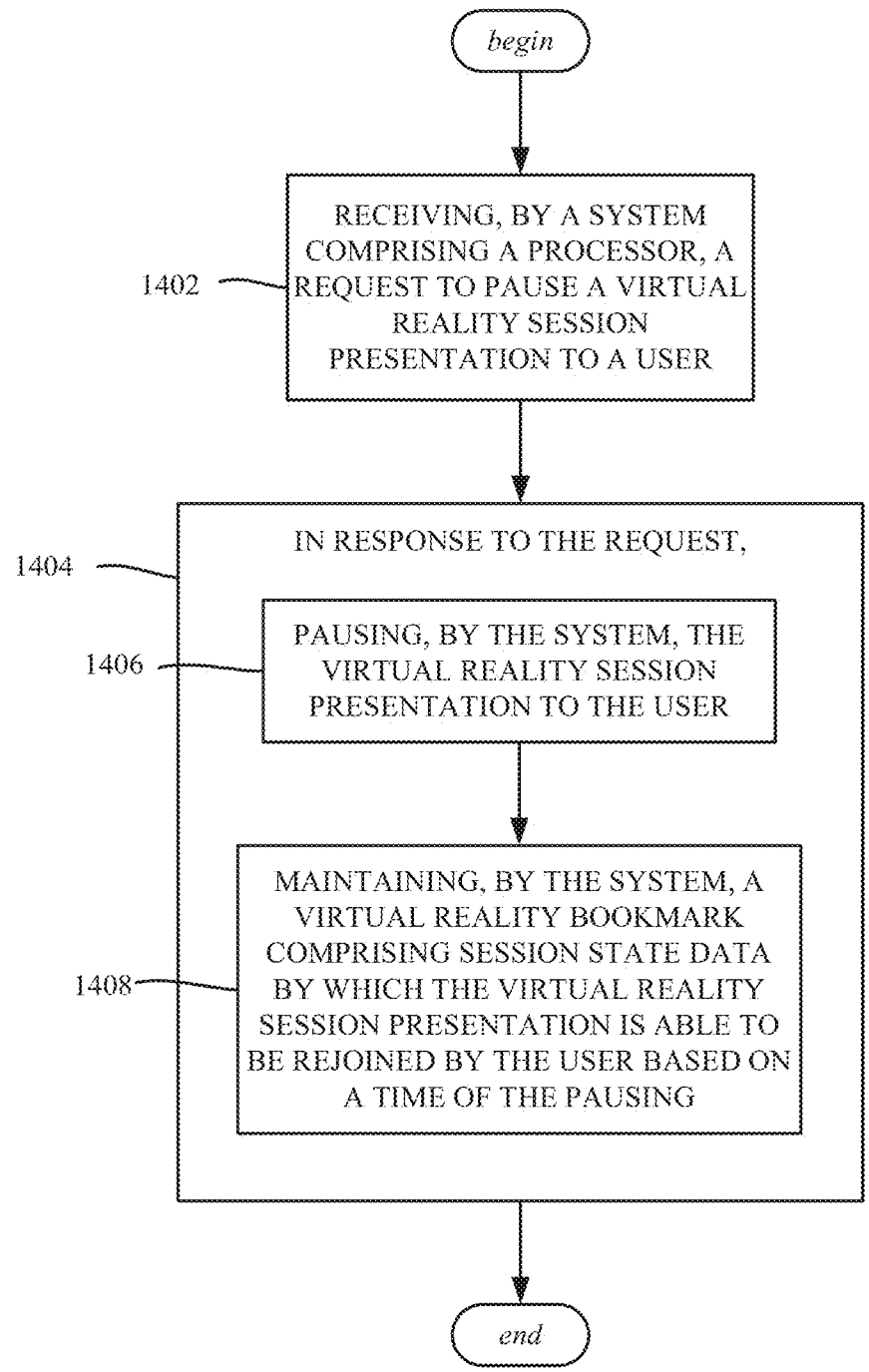
FIG. 14 is a flow diagram representing example operations related to maintain a virtual reality bookmark for a paused virtual reality session, in accordance with various aspects and embodiments of the subject disclosure.

One or more example aspects are represented in FIG. 14, and, for example, can correspond to operations, such as of a method. Example operation 1402 represents receiving, by a system comprising a processor, a request to pause a virtual reality session presentation to a user. Example operation 1404 represents, in response to the request, pausing, by the system, the virtual reality session presentation to the user (example operation 1406), and maintaining, by the system, a virtual reality bookmark comprising session state data by which the virtual reality session presentation is able to be rejoined by the user based on a time of the pausing (example operation 1408).

The virtual reality bookmark can include virtual time data, and further operations can include rejoining, by the system, the user to the virtual reality session presentation based on the virtual time data.

The user can be a first user, and further operations can include sharing, by the system, the virtual reality bookmark with a second user.

The user can be a first user, and further operations can include pausing, by the system, the virtual reality session presentation to a second user based on the request to pause.

Figure 15:
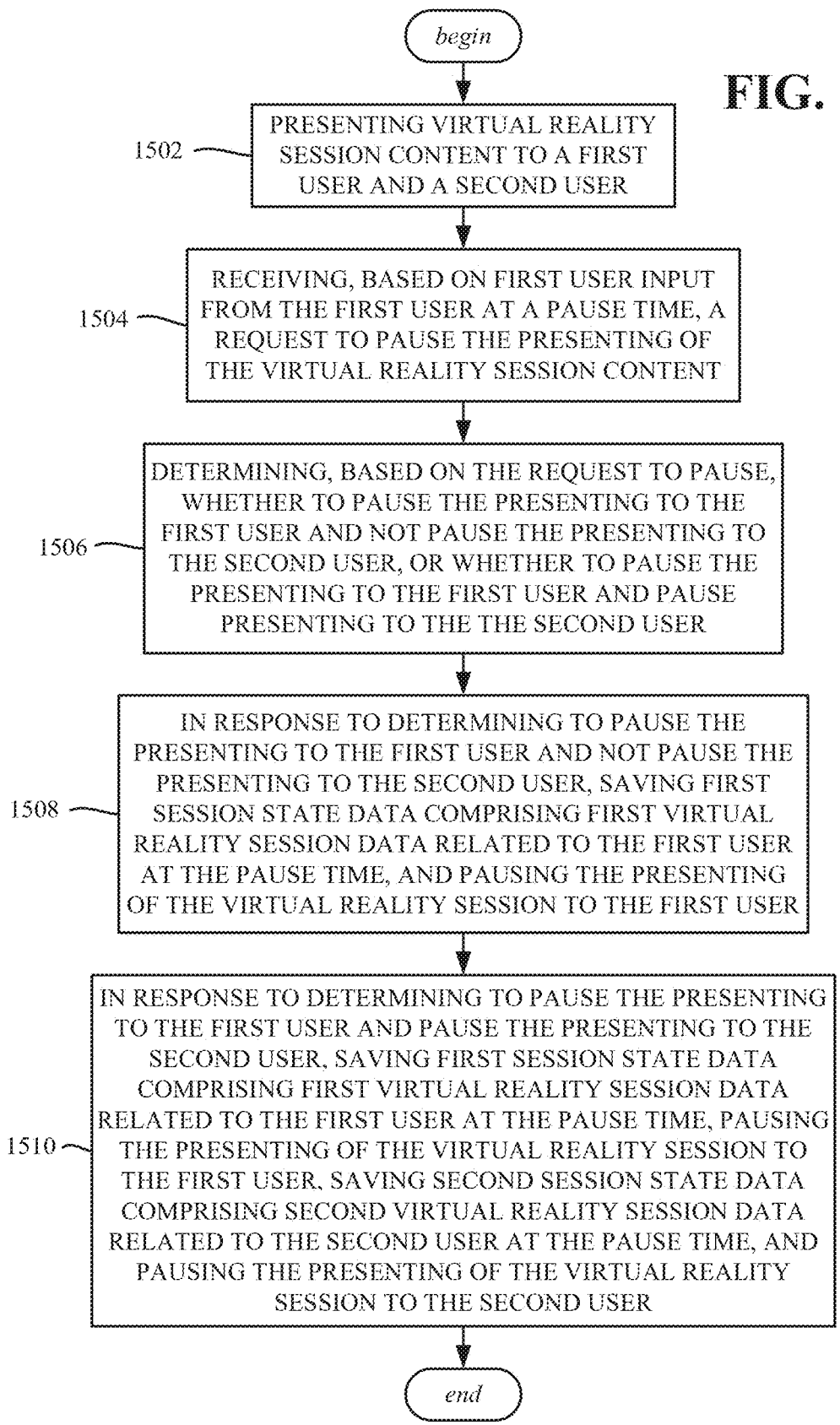
FIG. 15 is a flow diagram representing example operations related to determining to pause a first user with respect to a virtual reality session, determining to pause a second user with respect to the virtual reality session, or determining to pause both users, in accordance with various aspects and embodiments of the subject disclosure.

One or more aspects are represented in FIG. 15, such as implemented in a machine-readable medium, including executable instructions that, when executed by a processor, facilitate performance of operations. Example operation 1502 represents presenting virtual reality session content to a first user and a second user. Example operation 1504 represents receiving, based on first user input from the first user at a pause time, a request to pause the presenting of the virtual reality session content. Example operation 1506 represents determining, based on the request to pause, whether to pause the presenting to the first user and not pause the presenting to the second user, or whether to pause the presenting to the first user and pause presenting to the second user. Example operation 1508 represents in response to determining to pause the presenting to the first user and not pause the presenting to the second user, saving first session state data comprising first virtual reality session data related to the first user at the pause time, and pausing the presenting of the virtual reality session to the first user. Example operation 1510 represents in response to determining to pause the presenting to the first user and pause the presenting to the second user, saving first session state data comprising first virtual reality session data related to the first user at the pause time, pausing the presenting of the virtual reality session to the first user, saving second session state data comprising second virtual reality session data related to the second user at the pause time, and pausing the presenting of the virtual reality session to the second user.

Further operations can include receiving, based on second user input from the first user at a resume time that is later than the pause time, a request to resume presentation of the virtual reality content, and, in response to the request to resume the presentation, accessing the first virtual reality session data, and presenting resumed virtual reality session content to the first user based on the first virtual reality session data.

Further operations can include inviting the second user to resume the presenting of the resumed virtual reality session content at the resume time.

As can be seen, the technology described herein facilitates maintaining the state of a paused virtual reality session. The maintained state can be represented as a bookmark, and the user can save, review, share, and/or interact with the bookmark to resume the virtual reality session. The pausing and/or resuming can be for the one user, or more than one user. Resuming of a session can be scheduled for a future time. The technology described herein also allows a user to rejoin a virtual reality session paused for that user (but not paused for at least one other user) in real time, or at least the time of the not paused user.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 16:
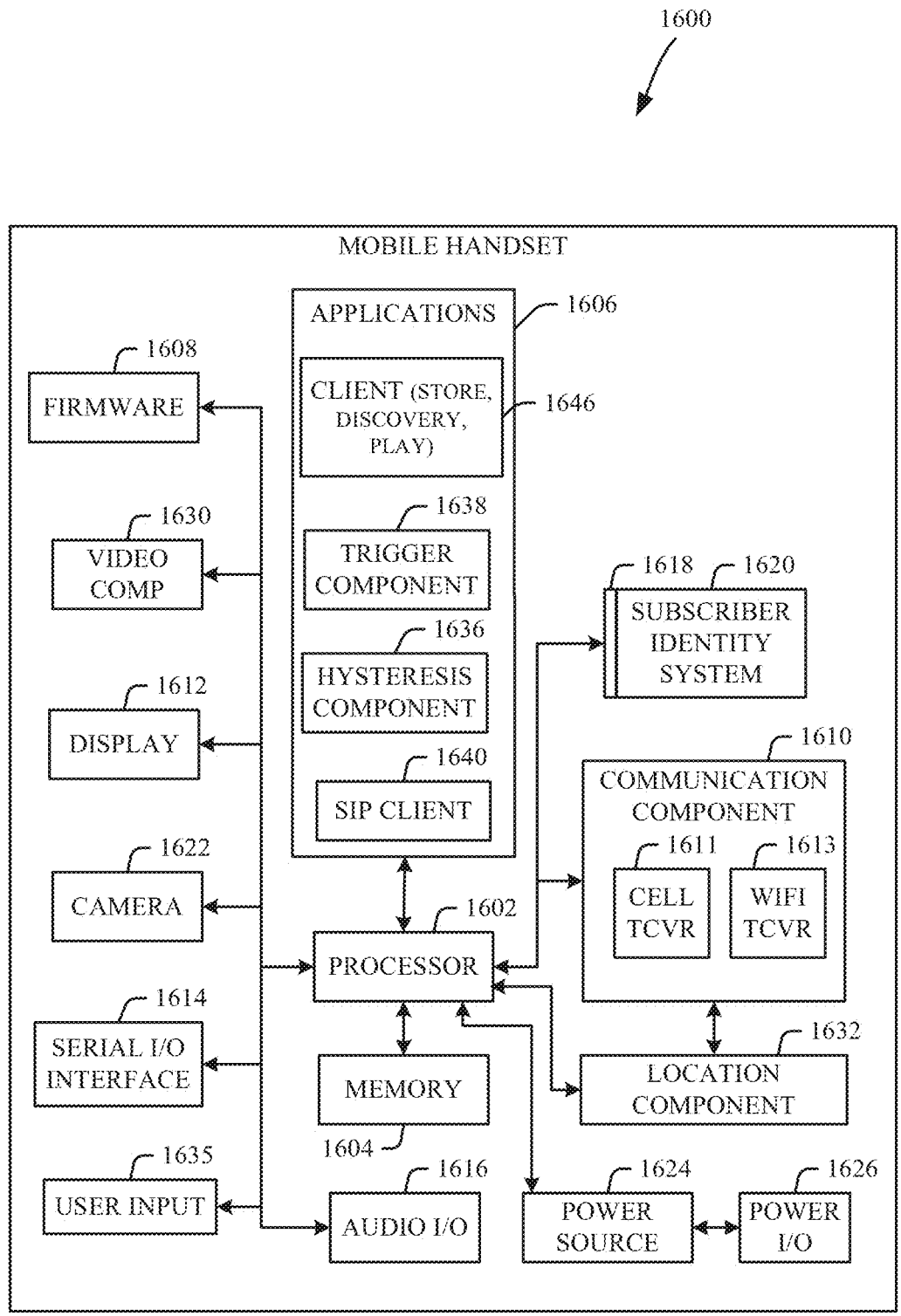
FIG. 16 illustrates an example block diagram of an example mobile handset operable to engage in a system architecture that facilitates wireless communications according to one or more embodiments described herein.

Referring now to FIG. 16, illustrated is a schematic block diagram of an example end-user device (such as user equipment) that can be a mobile device 1600 capable of connecting to a network in accordance with some embodiments described herein. Although a mobile handset 1600 is illustrated herein, it will be understood that other devices can be a mobile device, and that the mobile handset 1600 is merely illustrated to provide context for the embodiments of the various embodiments described herein. The following discussion is intended to provide a brief, general description of an example of a suitable environment 1600 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1600 includes a processor 1602 for controlling and processing all onboard operations and functions. A memory 1604 interfaces to the processor 1602 for storage of data and one or more applications 1606 (e.g., a video player software, user feedback component software, etc.). Other applications can include voice recognition of predetermined voice commands that facilitate initiation of the user feedback signals. The applications 1606 can be stored in the memory 1604 and/or in a firmware 1608, and executed by the processor 1602 from either or both the memory 1604 or/and the firmware 1608. The firmware 1608 can also store startup code for execution in initializing the handset 1600. A communications component 1610 interfaces to the processor 1602 to facilitate wired/wireless communication with external systems, e.g., cellular networks, VoIP networks, and so on. Here, the communications component 1610 can also include a suitable cellular transceiver 1611 (e.g., a GSM transceiver) and/or an unlicensed transceiver 1613 (e.g., Wi-Fi, WiMax) for corresponding signal communications. The handset 1600 can be a device such as a cellular telephone, a PDA with mobile communications capabilities, and messaging-centric devices. The communications component 1610 also facilitates communications reception from terrestrial radio networks (e.g., broadcast), digital satellite radio networks, and Internet-based radio services networks.

The handset 1600 includes a display 1612 for displaying text, images, video, telephony functions (e.g., a Caller ID function), setup functions, and for user input. For example, the display 1612 can also be referred to as a "screen" that can accommodate the presentation of multimedia content (e.g., music metadata, messages, wallpaper, graphics, etc.). The display 1612 can also display videos and can facilitate the generation, editing and sharing of video quotes. A serial I/O interface 1614 is provided in communication with the processor 1602 to facilitate wired and/or wireless serial communications (e.g., USB, and/or IEEE 1694) through a hardwire connection, and other serial input devices (e.g., a keyboard, keypad, and mouse). This supports updating and troubleshooting the handset 1600, for example. Audio capabilities are provided with an audio I/O component 1616, which can include a speaker for the output of audio signals related to, for example, indication that the user pressed the proper key or key combination to initiate the user feedback signal. The audio I/O component 1616 also facilitates the input of audio signals through a microphone to record data and/or telephony voice data, and for inputting voice signals for telephone conversations.

The handset 1600 can include a slot interface 1618 for accommodating a SIC (Subscriber Identity Component) in the form factor of a card Subscriber Identity Module (SIM) or universal SIM 1620, and interfacing the SIM card 1620 with the processor 1602. However, it is to be appreciated that the SIM card 1620 can be manufactured into the handset 1600, and updated by downloading data and software.

The handset 1600 can process IP data traffic through the communication component 1610 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1622 (e.g., a camera) can be provided for decoding encoded multimedia content. The video processing component 1622 can aid in facilitating the generation, editing and sharing of video quotes. The handset 1600 also includes a power source 1624 in the form of batteries and/or an AC power subsystem, which power source 1624 can interface to an external power system or charging equipment (not shown) by a power I/O component 1626.

The handset 1600 can also include a video component 1630 for processing video content received and, for recording and transmitting video content. For example, the video component 1630 can facilitate the generation, editing and sharing of video quotes. A location tracking component 1632 facilitates geographically locating the handset 1600. As described hereinabove, this can occur when the user initiates the feedback signal automatically or manually. A user input component 1634 facilitates the user initiating the quality feedback signal. The user input component 1634 can also facilitate the generation, editing and sharing of video quotes. The user input component 1634 can include such conventional input device technologies such as a keypad, keyboard, mouse, stylus pen, and/or touch screen, for example.

Referring again to the applications 1606, a hysteresis component 1636 facilitates the analysis and processing of hysteresis data, which is utilized to determine when to associate with the access point. A software trigger component 1638 can be provided that facilitates triggering of the hysteresis component 1638 when the Wi-Fi transceiver 1613 detects the beacon of the access point. A SIP client 1640 enables the handset 1600 to support SIP protocols and register the subscriber with the SIP registrar server. The applications 1606 can also include a client 1642 that provides at least the capability of discovery, play and store of multimedia content, for example, music.

The handset 1600, as indicated above related to the communications component 810, includes an indoor network radio transceiver 1613 (e.g., Wi-Fi transceiver). This function supports the indoor radio link, such as IEEE 802.11, for the dual-mode GSM handset 1600. The handset 1600 can accommodate at least satellite radio services through a handset that can combine wireless voice and digital radio chipsets into a single handheld device.

Figure 17:
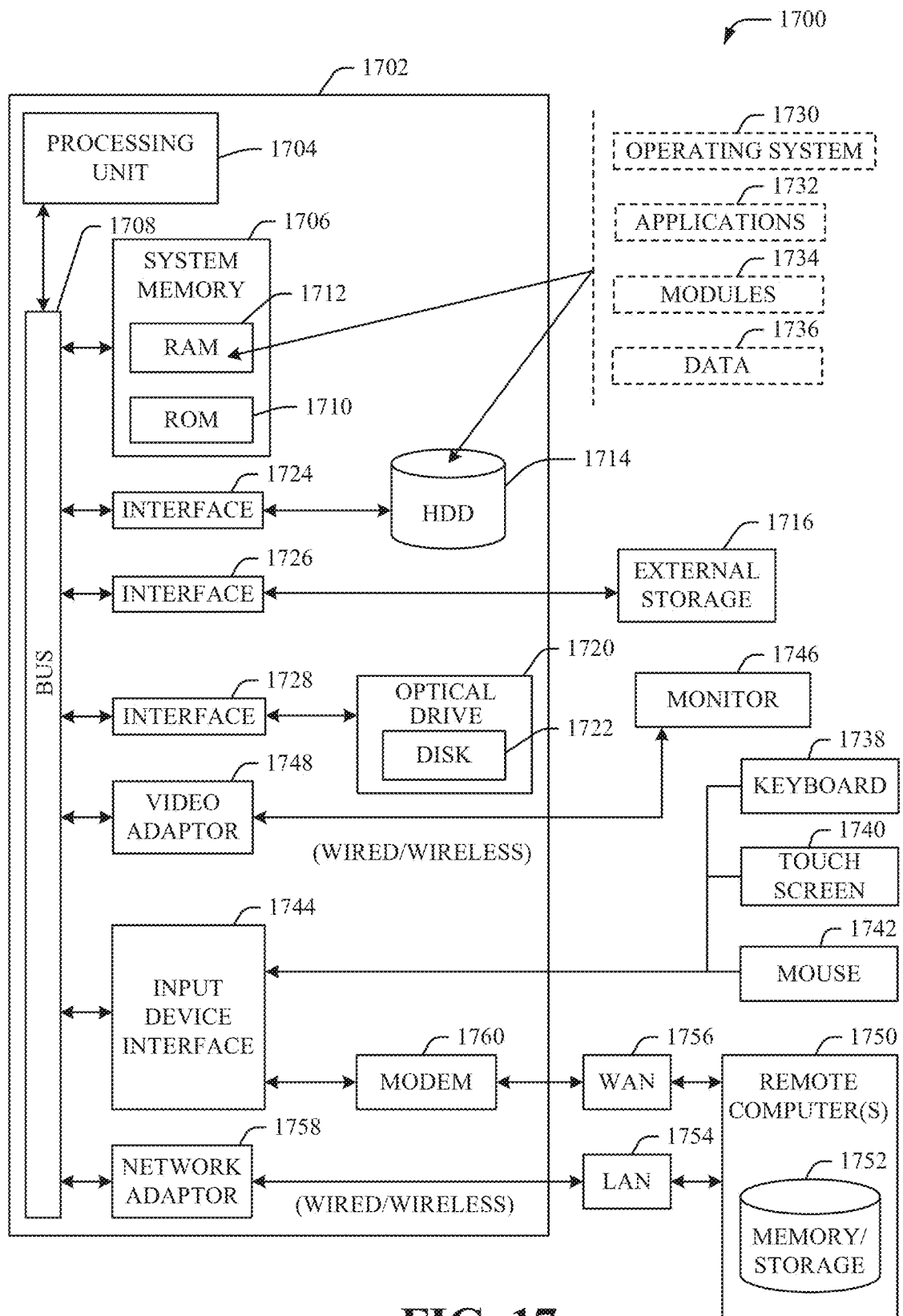
FIG. 17 illustrates an example block diagram of an example computer/machine system operable to engage in a system architecture that facilitates wireless communications according to one or more embodiments described herein.

In order to provide additional context for various embodiments described herein, FIG. 17 and the following discussion are intended to provide a brief, general description of a suitable computing environment 1700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid state drive (SSD), non-volatile memory and other storage technology could be used in addition to, or in place of, an HDD 1714, and can be internal or external. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1694 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally include emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can include one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can be enabled with a security module, such as a trusted processing module (TPM). For instance with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1694 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the Internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 17 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
a processor; and
a memory that stores executable instructions that, when executed by the processor of the system, facilitate performance of operations, the operations comprising:
presenting virtual reality session content to a plurality of user devices of a plurality of users;
receiving, based on first user input from a first user of the plurality of users at a first time, a request to pause the presenting of the virtual reality session content;
providing a selection to the first user, wherein the selection allows the first user to specify whether to pause the presenting of the virtual reality session content for the first user or for the plurality of users;
receiving the selection specifying a pause of the virtual reality session content for the plurality of users;
determining that the first user is authorized to pause the virtual reality session content for the plurality of users;
in response to the request to pause and to the determining that the first user is authorized, saving session state data comprising virtual reality session data at the first time, and pausing the presenting of the virtual reality session to the plurality of user devices of the plurality of users;
receiving, based on second user input from the first user at a second time that is later than the first time, a request to resume presentation of the virtual reality content; and
in response to the request to resume the presentation, accessing the virtual reality session data, and presenting resumed virtual reality session content to the plurality of user devices of the plurality of users based on the session state data.

2. The system of claim 1, wherein the operations further comprise presenting the virtual reality session to the first user, after the pausing, as a representation of a virtual reality bookmark.

3. The system of claim 1, wherein the first user is represented as an avatar in the virtual reality session, and wherein the session state data comprises at least one of: location data representing a location of the avatar in the virtual reality session at the first time, appearance data representing an appearance of the avatar at the first time, or field of view data representing a viewing perspective of the first user in the virtual reality session at the first time.

4. The system of claim 1, wherein the presenting of the resumed virtual reality session content to the plurality of user devices of the plurality of users comprises rejoining the first user at a current time within the virtual reality session.

5. The system of claim 1, wherein the operations further comprise presenting the virtual reality session to a second user of the plurality of users between the first time and the second time.

6. The system of claim 1, wherein the operations further comprise pausing the presenting of the virtual reality session to a second user based on the request to pause.

7. The system of claim 1, wherein the presentation is a first presentation, and wherein the operations further comprise sending an invitation to a second user to receive a second presentation of the virtual reality session at the second time.

8. The system of claim 1, wherein the operations further comprise sending an invitation to a second user to receive a second presentation of the virtual reality session at a scheduled future time.

9. The system of claim 1, wherein the operations further comprise continuing to present the virtual reality session to a second user after the pausing of the presentation of the virtual reality session to the first user.

10. The system of claim 9, wherein the operations further comprise presenting an avatar of the first user in an altered form as presented to the second user after the pausing of the presentation by the first user.

11. The system of claim 10, wherein the operations further comprise presenting an avatar of the first user in a form, as viewed by the second user, that is different from the altered form, after the resuming of the presentation of the virtual reality session by the first user.

12. The system of claim 1, wherein the operations further comprise detecting, after the resuming the presentation of the virtual reality session to the plurality of user devices of the plurality of users, interaction by the first user with the virtual reality session, and modifying the presentation of the virtual reality session based on the interaction.

13. The system of claim 12, wherein the modifying of the presentation of the virtual reality session based on the interaction comprises fast forwarding the presentation of the virtual reality session from a virtual time within the virtual reality session towards an actual time of the presentation of the virtual reality session.

14. A method, comprising:
receiving, by a system comprising a processor, a request from a first user of a plurality of users to pause a virtual reality session presentation to a plurality of user devices of the plurality of users; and
in response to the request,
determining that the first user is authorized to pause the virtual reality session presentation for the plurality of users;
pausing, by the system, the virtual reality session presentation to the plurality of user devices of the plurality of users, and
maintaining, by the system, a virtual reality bookmark comprising session state data by which the virtual reality session presentation is able to be rejoined by the plurality of users based on a time of the pausing.

15. The method of claim 14, wherein the virtual reality bookmark comprises virtual time data, and further comprising rejoining, by the system, the plurality of users to the virtual reality session presentation based on the virtual time data.

16. The method of claim 14, further comprising sharing, by the system, the virtual reality bookmark with a second user.

17. The method of claim 14, further comprising pausing, by the system, the virtual reality session presentation to a second user based on the request to pause.

18. A non-transitory machine-readable medium, comprising executable instructions that, when executed by a processor, facilitate performance of operations, the operations comprising:
presenting virtual reality session content to a plurality of user devices of a plurality of users including a first user;
receiving, based on first user input from the first user at a pause time, a request to pause the presenting of the virtual reality session content for the plurality of users;
determining, based on the request to pause, that the first user is authorized to pause the presenting of the virtual reality session content for the plurality of users; and
in response to determining that the first user is authorized to pause the presenting of the virtual reality session content for the plurality of users, saving first session state data comprising first virtual reality session data related to the plurality of users at the pause time, and pausing the presenting of the virtual reality session to the plurality of user devices of the plurality of users.

19. The non-transitory machine-readable medium of claim 18, wherein the operations further comprise receiving, based on second user input from the first user at a resume time that is later than the pause time, a request to resume presentation of the virtual reality session content, and, in response to the request to resume the presentation, accessing the first virtual reality session data, and presenting resumed virtual reality session content to the plurality of user devices of the plurality of users based on the first virtual reality session data.

20. The non-transitory machine-readable medium of claim 19, wherein the operations further comprise inviting a second user to resume the presenting of the resumed virtual reality session content at the resume time.

* * * * *